(No Model.) 2 Sheets—Sheet 1.
S. M. DORMAN.
TOE WEIGHT FOR HORSESHOES.
No. 386,388. Patented July 17, 1888.
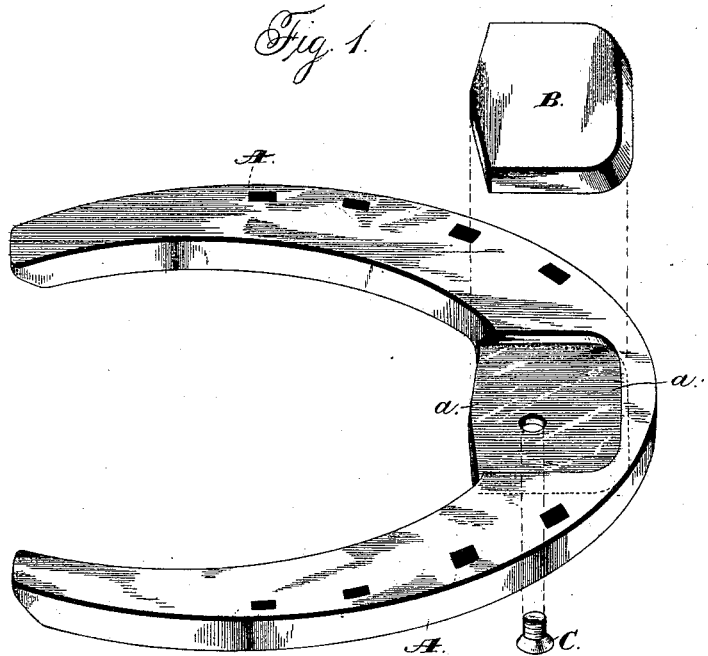
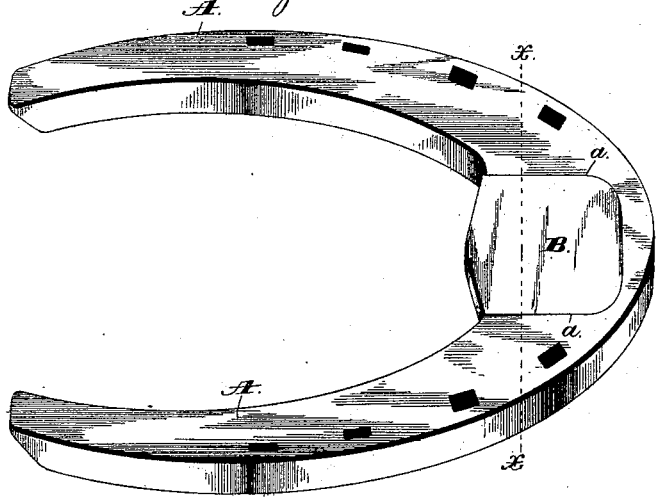
Witnesses:
Jas. E. Hutchinson
Chas. J. Williamson
Inventor:
Daniel M. Dorman, by
Prindle and Russell, his Attys.

(No Model.) 2 Sheets—Sheet 2.

S. M. DORMAN.
TOE WEIGHT FOR HORSESHOES.

No. 386,388. Patented July 17, 1888.

United States Patent Office.

SAMUEL M. DORMAN, OF NEWPORT, VERMONT.

TOE-WEIGHT FOR HORSESHOES.

SPECIFICATION forming part of Letters Patent No. 386,388, dated July 17, 1888.

Application filed January 10, 1888. Serial No. 260,310. (No model.)

*To all whom it may concern:*

Be it known that I, SAMUEL M. DORMAN, of Newport, in the county of Orleans and in the State of Vermont, have invented certain new and useful Improvements in Toe-Weights for Horseshoes; and I do hereby declare that the following is a full, clear, and exact description thereof, reference being had to the accompanying drawings, in which—

Figure 3:
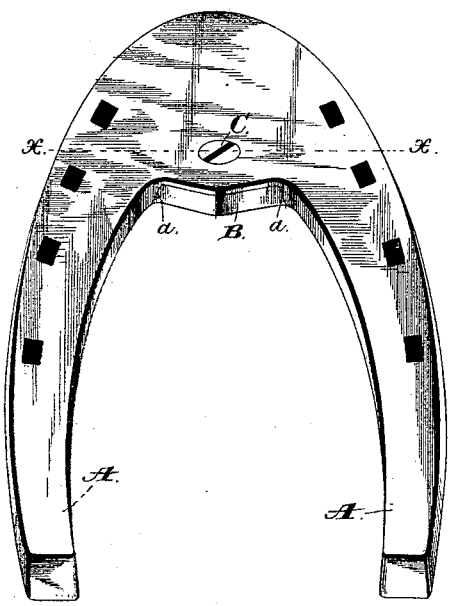
Figure 4:
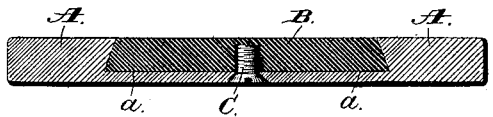

Figure 1 is a perspective view from the upper side of my shoe and toe-weight separated from each other. Fig. 2 is a like view of the same when combined. Fig. 3 is a perspective view from the lower side of said shoe when provided with a toe-weight, and Fig. 4 is a section upon line *x x* of Figs. 2 and 3.

Letters of like name and kind refer to like parts in each of the figures.

In the training of horses toe-weights have long been recognized as an almost indispensable aid; but as ordinarily used they are unsightly, difficult to place in or remove from position, and are liable to become injured by use.

The design of my invention is to enable toe-weights to be used without changing the appearance or interfering with the usual operation of the shoe; and to this end my said invention consists, principally, in a detachable toe-weight which is contained wholly within a recess in the upper side of a horseshoe, substantially as and for the purpose hereinafter specified.

It consists, further, in a horseshoe which is provided within its upper side with a recess, in combination with a toe-weight that is adapted to fit within such recess, and to be placed in and removed from position while the shoe is in place upon the hoof of a horse, substantially as and for the purpose hereinafter shown.

It consists, further, in the combination of a detachable toe-weight and a recessed horseshoe which is adapted to receive and contain said toe-weight and to wholly cover and protect its lower side, substantially as and for the purpose hereinafter set forth.

It consists, finally, in a horseshoe which is provided within its upper side with a recess, in combination with a detachable toe-weight that is adapted to fit into such recess, and with means for fastening said parts together, substantially as and for the purpose hereinafter shown and described.

In the carrying of my invention into practice I construct within the upper side, at the front of a horseshoe, A, a recess, *a*, which has the general form shown, and is open at its upper side and rear edge. The sides of said recess are preferably undercut, as shown, but may, if desired, be plain or vertical. Within the recess *a* is fitted a metal block, B, constructed from steel, iron, lead, or any alloy or amalgam to give to it the desired weight, which block or weight conforms to the shape of said recess, and is adapted to be inserted to place from the rear of the same, and when thus inserted is locked in position by means of a screw, C, that passes through the shoe A upward into said block and has its head *c* contained within a countersink, so as to be flush with the lower face of said shoe.

From the shape of the weight and its recess the former may be readily inserted to or removed from position while the shoe is fastened to the hoof of a horse, and as said weight in no manner changes the original shape of said shoe its presence or absence cannot be known except by lifting the foot of the horse, so as to be able to inspect the shoe from beneath.

As the weight is entirely protected from beneath, no injury thereto or to the receiving-recess can result from the use of the shoe, and the placing in or removing of said weight from position is in no manner interfered with by such use, so that the weight can be used for just such length of time, and as often as desired with no more trouble than is required for the placing in or removal from position of an ordinary harness.

The weight may be placed in any other position upon the shoe, if desired, the principle of operation being the same whether such weight is located in the front portion or at one side of a shoe. In the latter event two or more weights may be advantageously employed.

Having thus described my invention, what I claim is—

1. A detachable toe-weight which is contained wholly within a recess in the upper side of a horseshoe, substantially as and for the purpose specified.

2. A horseshoe which is provided within its upper side with a recess, in combination with a toe-weight that fits into and is contained wholly within such recess and is adapted to be placed in and removed from position while the shoe is secured upon the hoof of a horse, substantially as and for the purpose shown.

3. The combination of a detachable toe-weight and a recessed horseshoe which is adapted to receive and contain said toe-weight and to wholly cover and protect its lower side, substantially as and for the purpose set forth.

4. A horseshoe which is provided within its upper side with a recess, in combination with a detachable toe-weight that fits into and is contained wholly within such recess, and with means for fastening said parts together, substantially as and for the purpose shown and described.

In testimony that I claim the foregoing I have hereunto set my hand this 24th day of December, A. D. 1887.

SAMUEL M. DORMAN.

Witnesses:
H. S. ROOT,
HOMER THRASHER.